Feb. 17, 1942.   S. B. HEATH, ET AL   2,273,707
METHOD OF MAKING PURE MAGNESIUM OXIDE
Filed Oct. 30, 1939
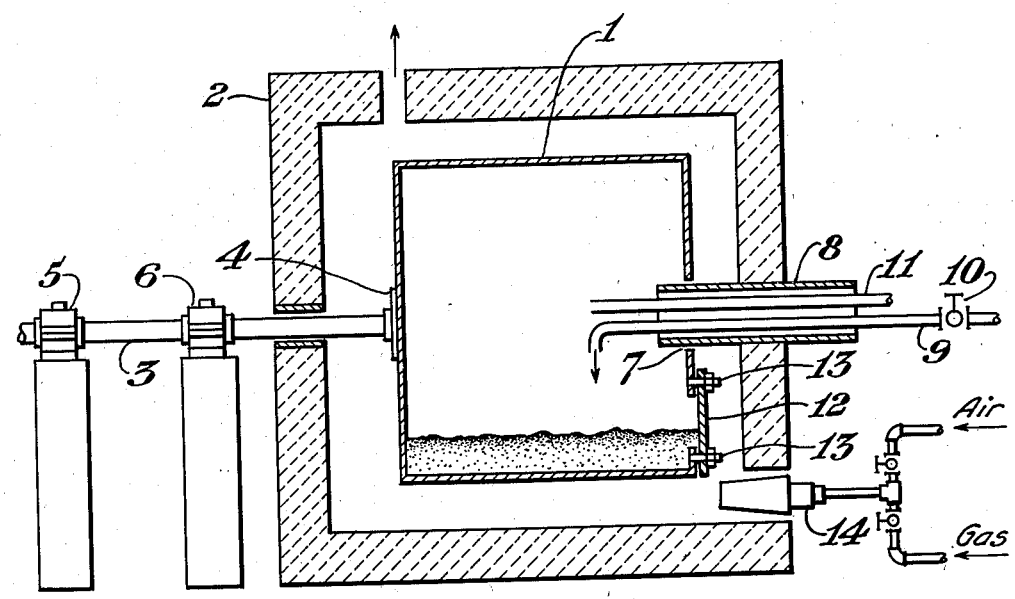
INVENTORS
Sheldon B. Heath
Alvin D. Dahl
BY Griswold & Burdick
ATTORNEYS Patented Feb. 17, 1942

2,273,707

UNITED STATES PATENT OFFICE 2,273,707

METHOD OF MAKING PURE MAGNESIUM OXIDE

Sheldon B. Heath and Alvin D. Dahl, Midland, Mich., assignors to The Dow Chemical Company, Midland, Mich., a corporation of Michigan Application October 30, 1939, Serial No. 301,894

4 Claims. (Cl. 23—201)

The invention relates to a method of producing magnesium oxide of high purity. It more particularly concerns a method of producing highly pure magnesium oxide from metallic magnesium and water or steam.

In one of the uses of magnesium oxide, as wherein it is to be used as an electrical insulator and heat conductor for an electric resistance wire heating element in stoves or the like, it is desirable and in most instances necessary that it be of high purity, for otherwise its electrical conductivity is sufficiently high to reduce the efficiency of the heating elements to the extent that they are impractical for commercial use. For example, wherein magnesium oxide is used as an electric insulator and heat conductor, it has been found desirable that the alkalies should be entirely absent or present only in spectroscopic traces, iron should not be present in an amount substantially above 0.05 per cent, aluminum oxide and calcium oxide should not be present in amounts substantially above 0.05 and 0.5 per cent, respectively while silicon oxide should not be present in an amount substantially above 2.0 per cent.

It is, therefore, the principal object of the invention to provide a method of making magnesium oxide of a purity such that its electrical conductivity is of a very low value.

Another object of the invention is to provide a method of producing magnesium oxide of high purity from metallic magnesium and steam or water.

Still other objects and advantages will be apparent as the description of the invention proceeds.

We have discovered that by subjecting metallic magnesium to the action of steam or water at high temperature in a container made of suitable material out of the presence of air or other gases which react with the magnesium, particularly carbon dioxide and nitrogen, while controlling the volume of steam or water coming into contact with the magnesium metal, the temperature and rate of reaction between the steam and metallic magnesium is susceptible of control so as to render the process practically operable and a magnesium oxide of high purity can be produced.

The invention then resides in the method hereinafter more fully described, the following description and accompanying drawing setting forth in detail one mode of carrying out the invention, such mode illustrating, however, but one of the various ways in which the invention may be carried into effect.

In the drawing, the single figure is a diagrammatic view in vertical section of a drum-type reactor adapted to be rotated in a furnace setting.

As shown, reactor 1, surrounded by furnace 2, is provided at one end with a shaft 3 rigidly attached to the end of the reactor at 4 so that as the shaft 3 is rotated on supporting bearings 5 and 6 the reactor is also caused to turn about its axis. The other end of the drum reactor is provided with a central opening 7, through which sleeve 8, depending from the furnace wall, extends into the reactor 1. The opening 7 is provided of such a diameter that there will be clearance between the sleeve and the end of the drum as is rotated about the sleeve 8. A water or steam line 9, suitably controlled by valve 10, extends into the reactor through the sleeve 8 and serves as a means whereby water or steam, as the case may be, may be introduced into the reactor. A thermo-couple well 11 also extends into the reactor through the sleeve 8 and acts as a receiver for a thermo-couple which serves to indicate the temperature interiorly of the reactor. The reactor 1 is also provided with a door 12, held in place as by means of clamping bolts 13, which serves as a means whereby the reactor may be charged and the product removed therefrom. A burner 15 of conventional design is provided as a source of heat and is located so that the flame may be directed against reactor 1 as it is rotated.

The operation of the method will be best understood from the following description wherein a charge of metallic magnesium is reacted with steam and converted to magnesium oxide. Reactor 1 is charged with a suitable amount of magnesium metal and heat is applied to the reactor as shaft 3 is caused to rotate. The temperature of the reactor is gradually increased, but, before reaction temperature is reached, a quantity of water or steam is introduced thereinto through water or steam line 9 to sweep any air from the reaction chamber. The introduction of steam or water is continued and, as the temperature of the reactor reaches about 650° C., the melting point of magnesium metal, the reaction between the magnesium and the steam rapidly begins. The introduction of water is continued at such a rate as to maintain the temperature of the reactor between about 650° and 800° C. Considerable care must be exercised as regards the rate of introduction of water or steam into the presence of the magnesium since the reaction between molten magnesium and steam is of a violent nature. As the reaction continues, the hydrogen produced is swept from the reactor through the opening around the sleeve 8 and burns upon coming in contact with air. The burning hydrogen is forced through the opening at considerable pressure and thus acts to exclude air from the reactor. After about 2½ hours, depending however on the amount of magnesium being reacted, the rate of introduction and amount of water or steam introduced, and the temperature of the reaction, the evolution of hydrogen through the opening will cease, indicating that the reaction is complete. After the evolution of hydrogen has ceased the introduction of steam or water is stopped and heat applied to keep the temperature of the reactor substantially above 650° C. for approximately ½ hour in order to insure that any magnesium hydroxide formed will be converted into magnesium oxide. The reactor may then be allowed to cool, after which the product may be withdrawn therefrom.

The rate of reaction and the temperature of the reaction can be controlled by controlling the rate at which the steam or water is introduced into the reactor. Since a large amount of heat is given off as the steam reacts with the metallic magnesium, the temperature of the reaction can be raised by increasing the rate of introduction of the steam or water or lowered by decreasing the rate of introduction of the water. The water employed should be relatively pure in order that a pure product will be obtained. Distilled water that has been recently boiling to drive off gases dissolved therein capable of affecting the purity of the product is preferably employed. In general, a considerable excess of water is employed over the theoretical required for the reaction between metallic magnesium and steam or water to produce magnesium oxide. Satisfactory results are obtained employing from 50 to 85 per cent excess water over the theoretical. The water vapor may be supplied to the reactor in the form of superheated steam, and, if desired, the steam may be superheated to such a temperature that it is unnecessary to supply additional heat to the reactor to bring about reaction between the steam and metallic magnesium.

The magnesium metal employed in carrying out the method should be at least as high a purity as that desired in the product. However, we have found that the ordinary magnesium of commerce is usually satisfactory and gives a product of suitable purity. The metal may be used in any suitable form such as rods, billets, ingots, powder, or the like.

The reactor or container in which the reaction is carried out should be made of, or at least lined with, a metal that does not scale or otherwise liberate materials that contaminate the product at the temperature of the reaction. For example, reactors made of or lined with a stainless steel, such as one containing 18 per cent chromium and 8 per cent nickel, or one made of or lined with nickel or inconel, may be suitably used without contaminating the product.

During the reaction the reactor should be rotated so that the magnesium oxide or hydroxide that first forms is scraped or broken away from the surface of the metal exposing fresh metal to the action of the steam. In a drum reactor, such as that above described, a peripheral speed of from 2 to 6 inches, and preferably 4 inches, per minute has been found to be most satisfactory.

While a rotating reactor is preferably employed because of the ease of controlling the temperature and rate of reaction, a stationary reactor may be employed and superheated steam introduced of such a temperature that additional heat need not be supplied to bring about reaction. If a stationary reactor is to be employed, it may be suitably lined with a refractory such as magnesia in suitable form.

In the foregoing manner, magnesium metal may be converted into magnesium oxide of high purity such that it may be suitably employed as an electrical insulator and heat conductor for electrical resistance wire heating elements or the like, or even as a chemical reagent.

We claim:

1. In a method of producing highly pure magnesium oxide from metallic magnesium and water, the steps which comprise adding water to a body of molten magnesium in an enclosed space in the absence of air and at substantially atmospheric pressure, controlling the rate of addition of the water so that the temperature of the reaction does not exceed about 800° C., stopping the addition of water when the evolution of hydrogen substantially ceases, and thereafter heating the reaction mixture above about 650° C.

2. In a method of producing highly pure magnesium oxide from metallic magnesium and water, the steps which comprise adding substantially pure water to a body of molten magnesium in the absence of air and at substantially atmospheric pressure, controlling the addition of water so that the temperature of the reaction is between 651° to 800° C., stopping the addition of water when the evolution of hydrogen substantially ceases, and thereafter heating the reaction mixture above about 650° C.

3. In a method according to claim 1 in which the water is supplied to the reaction in the form of steam.

4. In a method according to claim 1 in which the water is supplied to the reaction in the form of superheated steam and the subsequent heating operation carried out after the evolution of hydrogen ceases is conducted above about 750° C.

SHELDON B. HEATH.
ALVIN D. DAHL.